(12) United States Patent
Suzuki

(10) Patent No.: US 9,490,466 B2
(45) Date of Patent: Nov. 8, 2016

(54) TERMINAL ATTACHMENT STRUCTURE

(75) Inventor: Takafumi Suzuki, Yamanashi-ken (JP)

(73) Assignee: SUNCALL CORPORATION, Kyoto (JP)

( * ) Notice: Subject to any disclaimer, the term of this patent is extended or adjusted under 35 U.S.C. 154(b) by 288 days.

(21) Appl. No.: 14/110,989

(22) PCT Filed: Apr. 16, 2012

(86) PCT No.: PCT/JP2012/060210
§ 371 (c)(1),
(2), (4) Date: Oct. 10, 2013

(87) PCT Pub. No.: WO2012/144444
PCT Pub. Date: Oct. 26, 2012

(65) Prior Publication Data
US 2014/0038022 A1 Feb. 6, 2014

(30) Foreign Application Priority Data
Apr. 19, 2011 (JP) ................... 2011-092716

(51) Int. Cl.
*H01M 2/30* (2006.01)
*H01M 2/06* (2006.01)
(Continued)

(52) U.S. Cl.
CPC ............ *H01M 2/305* (2013.01); *H01M 2/06* (2013.01); *H01R 4/06* (2013.01); *H01M 10/0525* (2013.01); *Y02T 10/7011* (2013.01)

(58) Field of Classification Search
CPC ...... H01M 2/20; H01M 2/202; H01M 2/204; H01M 2/22; H01M 2/30
See application file for complete search history.

(56) References Cited

U.S. PATENT DOCUMENTS

2009/0087737 A1* 4/2009 Yamauchi ............... H01M 2/22
429/185
2011/0045345 A1* 2/2011 Tsuchiya ................. H01M 2/22
429/179
(Continued)

FOREIGN PATENT DOCUMENTS

JP 08-096649 4/1996
JP 3081847 8/2000
(Continued)

OTHER PUBLICATIONS

International Search Report issued Jul. 10, 2012 in International (PCT) Application No. PCT/JP2012/060210.
(Continued)

*Primary Examiner* — Alix Eggerding
(74) *Attorney, Agent, or Firm* — Wenderoth, Lind & Ponack, L.L.P.

(57) ABSTRACT

A terminal attachment structure allows a terminal to be firmly and closely fixed to a terminal attachment plate in a stable state even under external vibrations or impact, and a joint surface can be flatly finished without a difference in level between the terminal and the terminal attachment plate. The terminal attachment structure has the terminal attachment plate including a polygonal groove portion and a through hole formed in a center of the groove portion, and the terminal including a flange that has the same polygonal shape as that of the groove portion, a leg part that extends from a lower surface of the flange and inserts into the through hole, and a terminal main body that extends from an upper surface of the flange. After the flange is fitted into the groove portion, the leg portion is flattened to fix the terminal to the terminal attachment plate.

8 Claims, 6 Drawing Sheets

(51) Int. Cl.
*H01R 4/06* (2006.01)
*H01M 10/0525* (2010.01)

(56) References Cited

U.S. PATENT DOCUMENTS

| | | | | |
|---|---|---|---|---|
| 2011/0281155 | A1* | 11/2011 | Ito | H01M 2/0473 429/179 |
| 2012/0064380 | A1* | 3/2012 | Kim | H01M 2/08 429/66 |
| 2012/0264007 | A1* | 10/2012 | Sasaki | H01M 2/043 429/182 |
| 2014/0216814 | A1* | 8/2014 | Suzuki | H01M 2/206 174/84 C |

FOREIGN PATENT DOCUMENTS

| | | |
|---|---|---|
| JP | 2000-294225 | 10/2000 |
| JP | 2001-357833 | 12/2001 |
| JP | 2003-092103 | 3/2003 |
| JP | 2005-259388 | 9/2005 |
| JP | 2010-040533 | 2/2010 |

OTHER PUBLICATIONS

Machine Translation of JP 2003-092103 having a publication date of Mar. 28, 2003.
Machine Translation of JP 2001-357833 having a publication date of Dec. 26, 2001.
Machine Translation of JP 2000-294225 having a publication date of Aug. 28, 2000.
Japanese Notification of Reasons for Refusal issued Jan. 15, 2014 in corresponding Japanese Patent Application No. 2011-092716 with English translation.
Chinese Office Action issued Jun. 3, 2015 in corresponding Chinese Patent Application No. 201280018910.1 with English translation.
Second Office Action issued Jan. 4, 2016 in counterpart Chinese Patent Application No. 201280018910.1 with English translation.

* cited by examiner (a)

(b)

(a)

(b)

TERMINAL ATTACHMENT STRUCTURE

TECHNICAL FIELD

The present invention relates to a terminal attachment structure including a terminal attachment plate and a terminal to be swaged and fixed to the terminal attachment plate.

BACKGROUND ART

Conventionally, a terminal attachment structure in which a terminal is swaged and fixed to a terminal attachment plate made of metal has been widely used in storage secondary batteries and the like included in industrial electric equipment, automobiles, and the like (Patent Literature 1). Such secondary batteries are configured to include a battery pack having a storage function and one or more pairs of electrode terminals which are attached to a front surface of the battery pack and used for connection with external equipment. In conventional automobiles, a pair of electrode terminals is arranged on a lead-acid battery serving as a battery. Recent hybrid vehicles and electric vehicles include a plurality of lithium ion batteries mounted as secondary batteries. A plurality of electrode terminals have therefore been needed according to the number of lithium ion batteries mounted.

Because of high storage capacity and in view of ensuring stability and safety, such car-mounted secondary batteries use electrode terminals that are formed by working a highly-conductive metal material into a constant thickness and diameter. To obtain favorable conductivity as well as endure vibrations and external impact, the terminals are firmly attached by swaging that is capable of fixing without using an adhesive or the like (Patent Literature 2).

A terminal assembly having the foregoing structure typically includes a terminal attachment plate that can be attached to the surface of a battery pack or the like, and a terminal to be inserted and fixed to the terminal attachment plate. The terminal attachment plate is formed as a thin plate of a metal material, and has a through hole for the terminal to be inserted through. The terminal often includes a terminal main body formed as a circular or prismatic column of a metal material, a flange integrally formed to extend outward from the outer periphery of the terminal main body, and a leg part extending below the flange.

After the leg part extending below the flange is passed through the through hole and the flange is placed on the terminal attachment plate, the terminal is attached by swaging and fixing, i.e., flattening the leg portion against the back side of the terminal attachment plate by using a striking tool such as a punch.

CITATION LIST

Patent Literature

Patent Literature 1: Japanese Patent Application Laid-Open No. 2005-259388
Patent Literature 2: Japanese Patent Application Laid-Open No. Hei. 8-96649

SUMMARY OF THE INVENTION

Technical Problem

In the foregoing terminal assembly, the leg part of the terminal is flattened to spread out and come into close contact with the periphery of the through hole, and therefore will not easily come off the terminal attachment plate. However, there has been the problem that if a gap occurs between the surface of the terminal attachment plate and the flange, the terminal main body can wobble or rotate. Such a wobble or rotation of the terminal main body can twist the connected lead wire or cause variations in the electrical resistance of the conducting part, sometimes deteriorating electric characteristics such as charging and discharging.

Moreover, the thickness of the flange in close contact with the surface of the terminal attachment plate causes a difference in level at the surface of the terminal attachment plate. There has thus been the problem that if such a terminal assembly is simply attached to the surface of a battery pack or the like, the resulting gap can lower the joint strength. In order to alleviate the problem, spacer members corresponding to the thickness of the flange may be provided on the attaching surface. However, this increases the parts count, and in the case of a high-capacity battery pack requiring a large number of terminals, causes the problem of increased manufacturing costs and product costs.

Furthermore, since the positioning point between the terminal and the terminal attachment plate is not defined, there has been difficulty in assembly that the terminal main body needs to be fixed or held against rotation at the time of swaging and fixing by using a tool such as a punch.

Therefore, it is an object of the present invention to provide a terminal attachment structure in which a terminal can be firmly and closely fixed to a terminal attachment plate in a stable state even under external vibrations or impact, and the joint surface can be flatly finished without a difference in level between the terminal and the terminal attachment plate.

Solution to Problem

In order to solve the foregoing problems, a terminal attachment structure according to the present invention includes: a terminal attachment plate having a polygonal groove portion that is formed by recessing an attachment surface and a through hole that is formed in a center of the groove portion; and a terminal having a flange that has the same polygonal shape as that of the groove portion, a leg part that extends from a lower surface of the flange and is inserted into the through hole, and a terminal main body that extends from an upper surface of the flange, wherein, after the flange is fitted into the groove portion, the leg part is flattened to swage and fix the terminal to the terminal attachment plate.

Advantageous Effects of the Invention

According to the terminal attachment structure of the present invention, the leg part of the terminal is inserted into and attached to the through hole formed in the center of the groove portion. Here, the flange formed on the terminal is fitted to the groove portion to ensure and facilitate positioning of the terminal. The leg part of the terminal thus fitted is swaged and fixed by flattening against the back side of the terminal attachment plate. Even if external vibrations or impact acts on the top surface or side surfaces of the terminal, the swaged and fixed terminal therefore will not loosen or wobble. This enables close contact and fixing in a firmer and more stable state.

Moreover, since the flange of the terminal is engaged with the groove portion formed in the terminal attachment plate without a difference in level, the surface of the flange becomes generally flush with the attachment surface of the terminal attachment plate. This provides the effect of improving the close contact of the position where the terminal attachment plate is attached.

Furthermore, the leg part of the terminal is formed to be greater in diameter than the terminal main body extending above the flange, and a conical recess is formed in the bottom surface thereof. This increases the spreading area of the leg part flattened about the recess, and makes the spreading widths generally uniform. The leg part of the terminal can thus be securely brought into close contact with and fixed to the back surface of the terminal attachment plate in a stable state.

DESCRIPTION OF EMBODIMENTS

Figure 1:
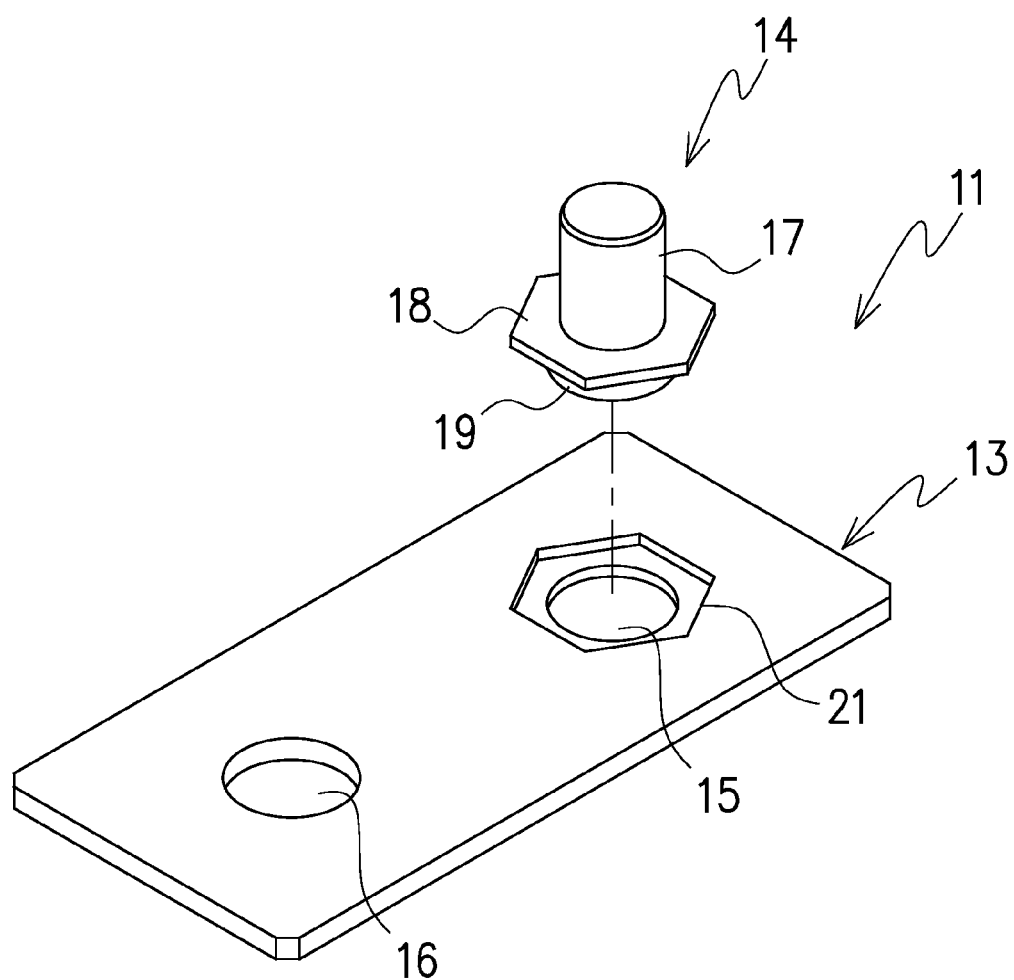
FIG. 1 is an exploded perspective view showing an embodiment of a terminal assembly embodying the terminal attachment structure according to the present invention.
Figure 6:
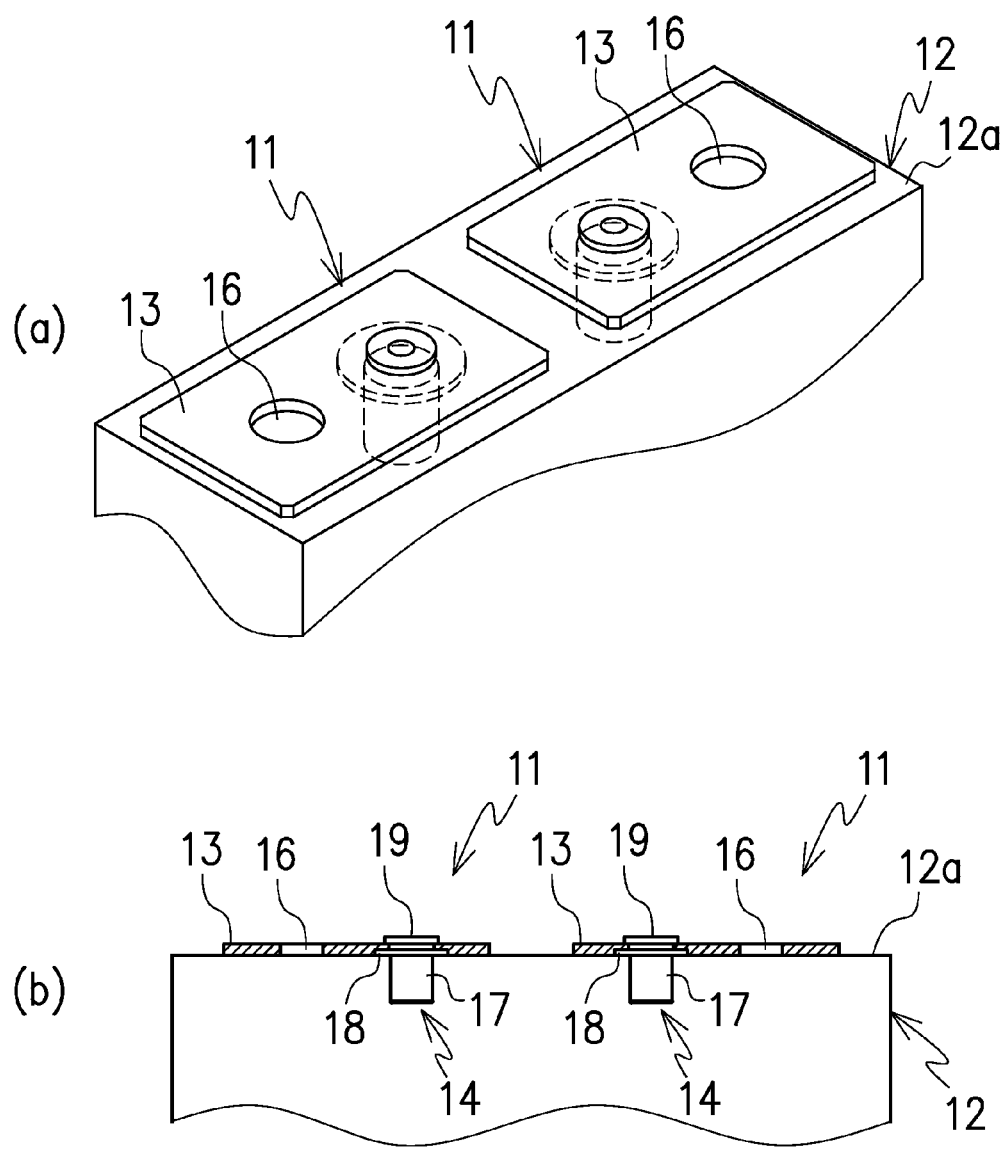
FIGS. 6(a) and 6(b) are a perspective view and a sectional view of a battery pack including the terminal assembly, respectively.

Hereinafter, an embodiment of a terminal assembly embodying the terminal attachment structure according to the present invention will be described in detail with reference to the accompanying drawings. A terminal assembly 11 shown in FIG. 1 includes, for example, a terminal 14 of cylindrical shape, serving as an electrical contact, and a terminal attachment plate 13 for the terminal 14 to be attached to. As shown in FIG. 6, an example of the terminal assembly 11 constitutes a part of electrode terminals attached to a front surface 12a of a battery pack 12.

Figure 2:
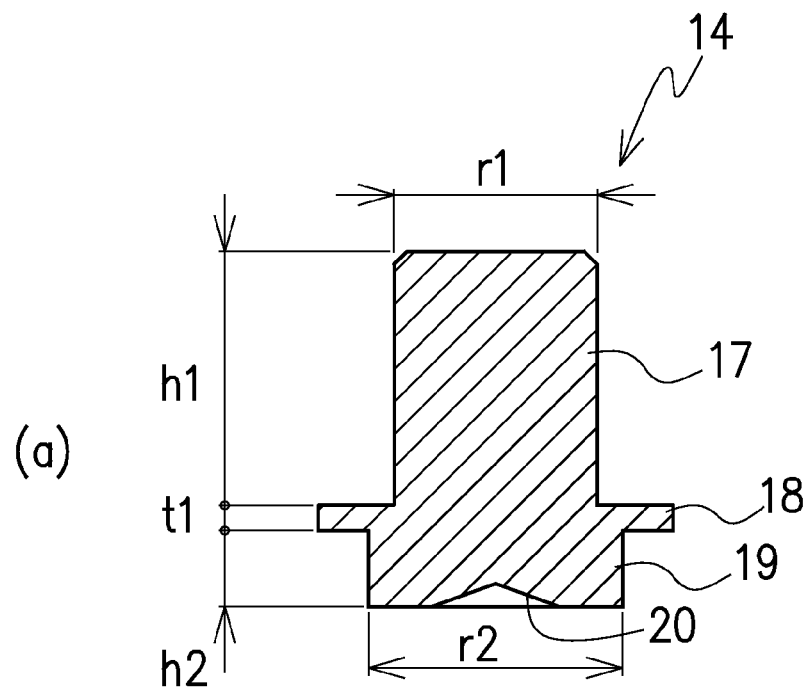
FIGS. 2(a) and 2(b) are a sectional view and a bottom view of a terminal of the terminal assembly, respectively.
Figure 2:
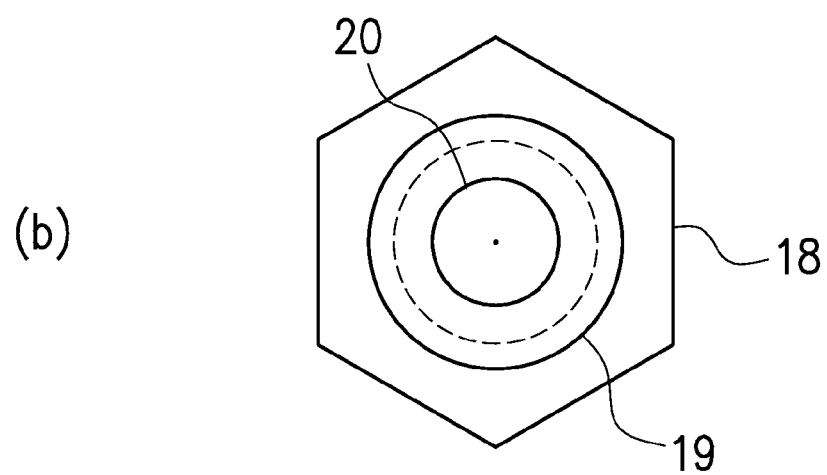

As shown in FIG. 2, the terminal 14 is integrally formed to include a terminal main body 17 which is made of a metal material such as copper and aluminum, a flange 18 which extends outward from an outer periphery of a lower portion of the terminal main body 17, and a leg part 19 of cylindrical shape which protrudes below the flange 18. To make contact with an external lead or contact for conduction, the terminal main body 17 is formed in a cylindrical or prismatic shape with a height conforming to a certain specification, for example, a height h1 of around 10 mm. The flange 18 is formed in a polygonal shape other than a perfect circular shape. For example, as shown in FIG. 2, the flange 18 is formed in a hexagonal shape. In view of the ease of flattening and the spread of flattening, the leg part 19 is formed to have a height h2 of approximately 3 mm and a diameter r2 somewhat greater than a diameter r1 of the terminal main body 17. The leg part 19 has a recess 20 in the center of its bottom surface. The recess 20 has a conical shape which guides an end of a swaging tool such as a punch and facilitates outward flattening. Thus, configuring the leg part 19 greater than the terminal main body 17 in diameter enables stable attachment to a groove portion 21 of the terminal attachment plate 13 to be described later, and can increase the spreading area of the bottom surface when flattened. This allows firmer swaging and fixing. The provision of the recess 20 having the conical shape in the bottom surface of the leg part 19 can accurately and easily guide the swaging tool such as a punch to a striking position, as well as make the spreading widths of the bottom surface of the struck leg part 19 generally uniform.

Figure 3:
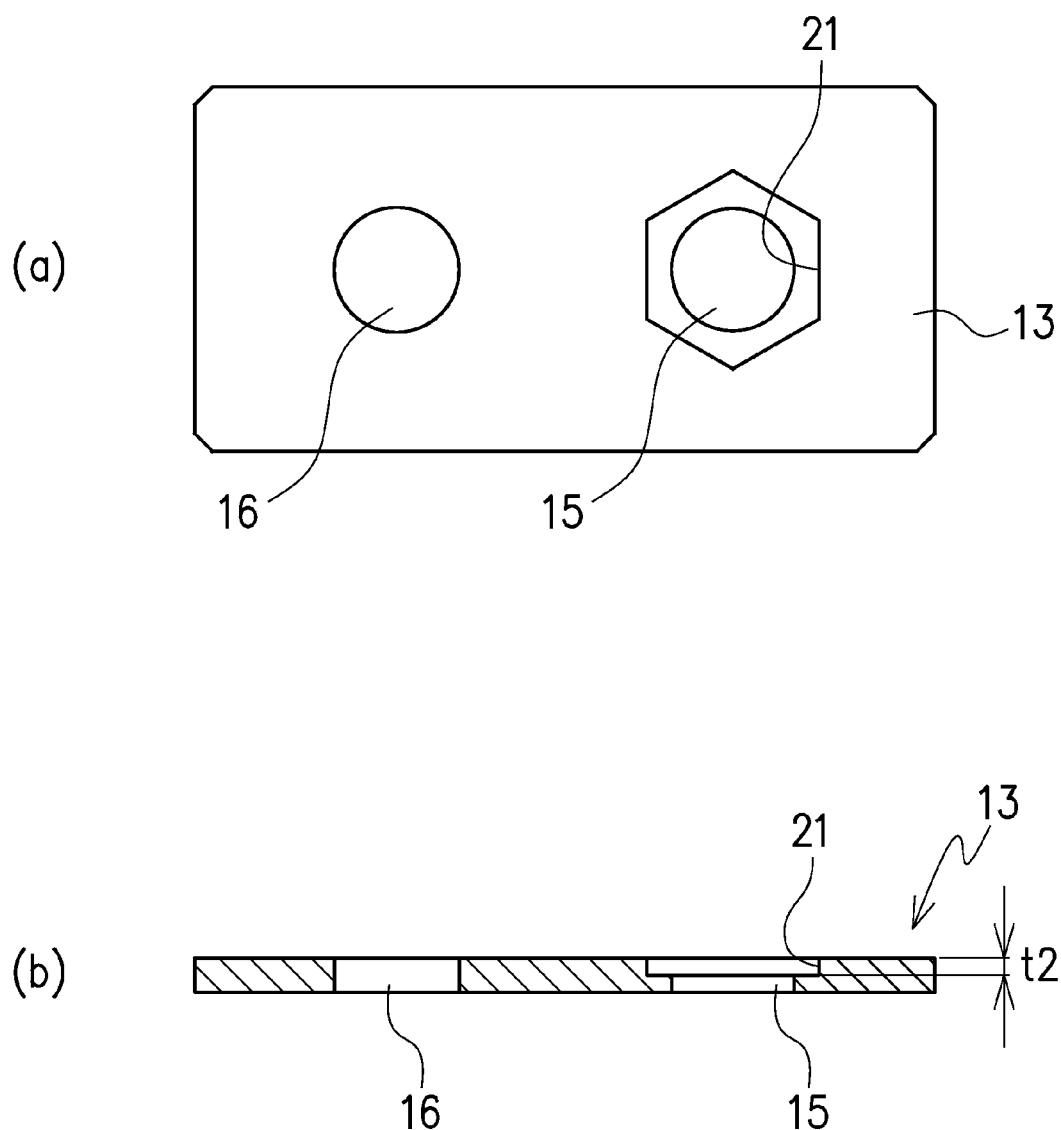
FIGS. 3(a) and 3(b) are a plan view and a sectional view of a terminal attachment plate of the terminal assembly, respectively.

As shown in FIG. 3, the terminal attachment plate 13 has in its surface the groove portion 21 having the same hexagonal shape as that of the flange 18, and a through hole 15 for the leg part 19 of the terminal 14 to be inserted through in the center of the groove portion 21. The through hole 15 has the same diameter (r2) as that of the leg part 19. In the present embodiment, the groove portion 21 and the flange 18 are hexagonal in shape, whereas the groove portion 21 and the flange 18 may be triangular to pentagonal. In this regard, since polygonal shapes closer to a circle can facilitate rotation of the terminal 14 and increases man-hours needed for processing, hexagonal and less polygonal shapes are preferred. The terminal attachment plate 13 is rectangular in shape, whereas the terminal attachment plate 13 may have a planar shape tailored to its attachment location. The terminal attachment plate 13 has an attachment hole 16, which is intended to attach an external connection terminal or the like other than the terminal 14. The position and diameter of the attachment hole 16 may be appropriately set according to the product to which the terminal attachment plate 13 is attached and the intended use thereof.

The groove portion 21 has a depth t2 generally one half the thickness of the terminal attachment plate 13. The flange 18 can be formed with a thickness t1 according to the depth t2 of the groove 21, which allows assembling such that the surface of the flange 18 of the terminal 14 swaged and fixed to the terminal attachment plate 13 and the surface of the terminal attachment plate 13 are generally flush without a difference in level.

Figure 4:
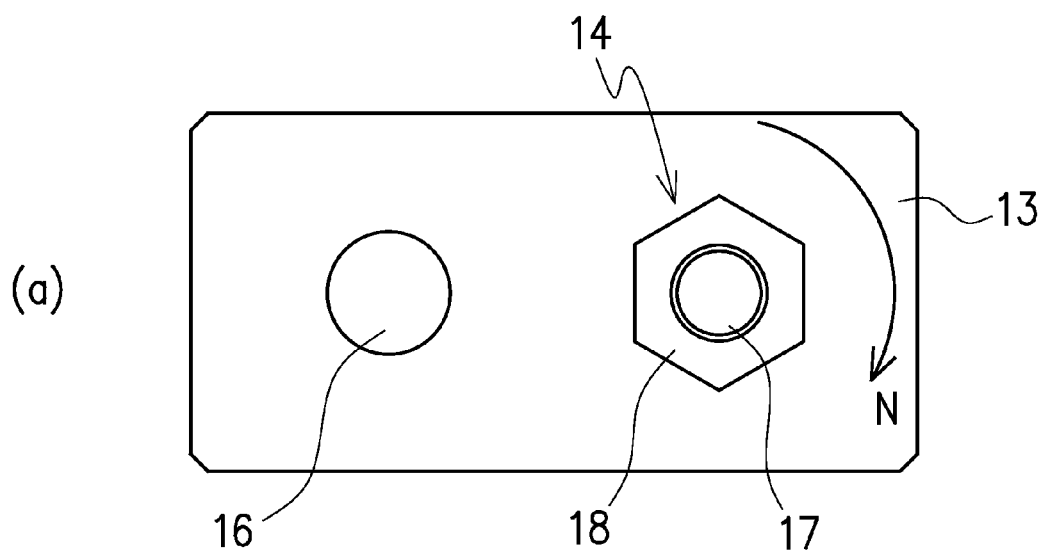
FIGS. 4(a) and 4(b) are a plan view and a sectional view, respectively, after the terminal assembly is assembled.
Figure 4:
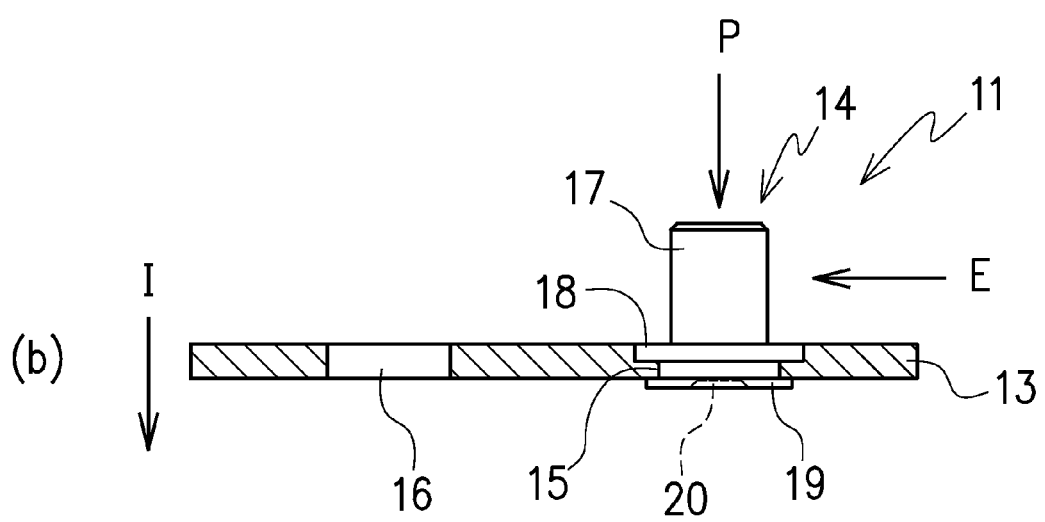

FIG. 4 shows a state where the terminal 14 is inserted, swaged, and fixed to the terminal attachment plate 13. The outer periphery of the flange 18 can be fitted into the inner periphery of the groove portion 21 to make close contact for engagement without a gap. The engaged surfaces have no difference in level and constitute a flat surface. The leg part 19 inserted through the through hole 15 can be flattened so that the lower portion of the leg part 19 spreads out around through hole 15 and make close contact with the back side of the terminal attachment plate 13.

Figure 5:
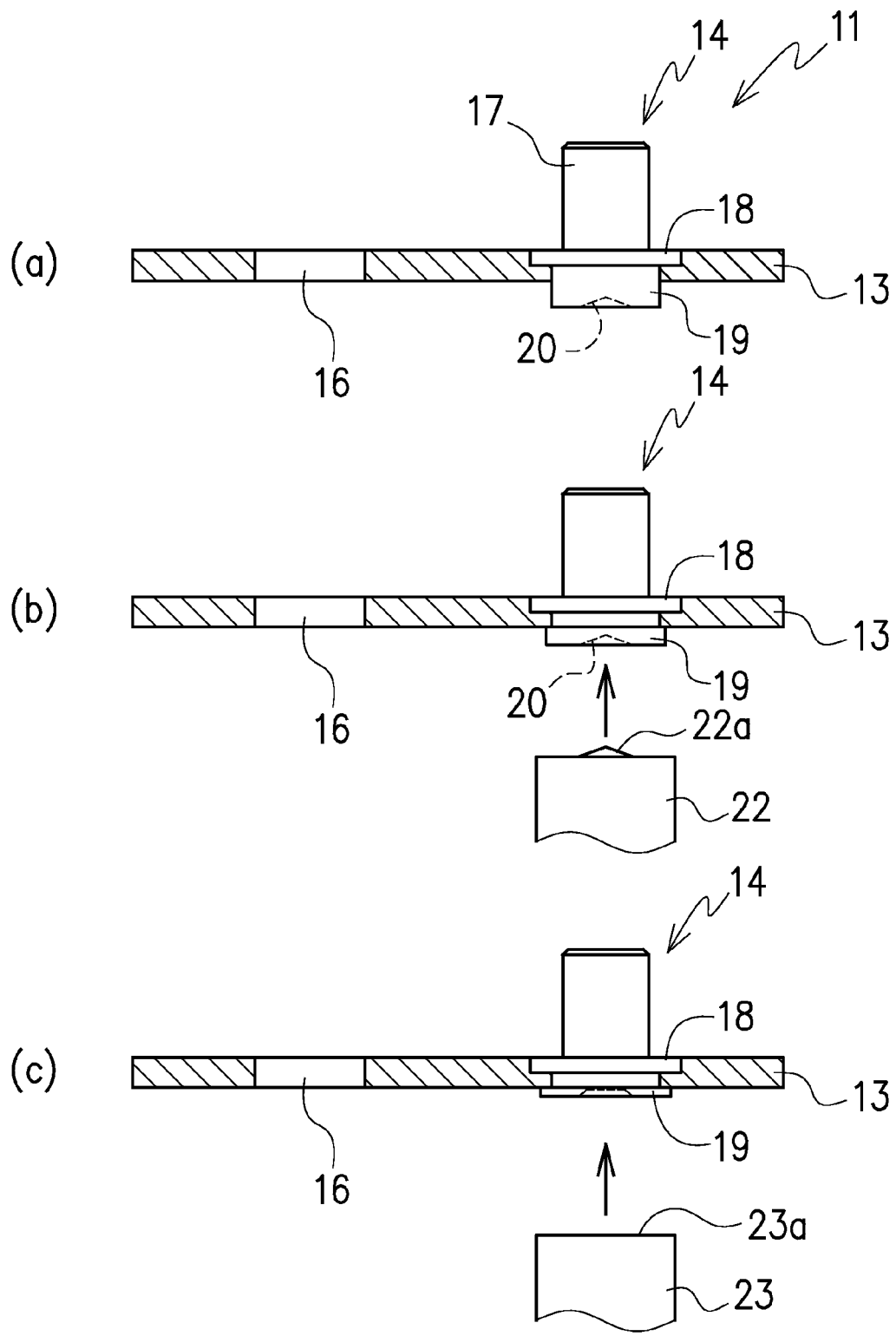
FIG. 5 is an explanatory diagram showing swaging and fixing steps of the terminal assembly.

FIG. 5 shows assembling steps of the terminal assembly 11. In a first step, the leg part 19 is passed through the through hole 15 so that the flange 18 is engaged with the groove portion 21 of the terminal attachment plate 13 (FIG. 5(a)). In a second step, a first swaging tool 22 having a convexly-protruding striking surface 22a is used to make an impact so that the striking surface 22a is inserted in the recess 20 of the leg part 19. This flattens the bottom surface of the leg part 19 to spread out in a circular shape (FIG. 5(b)). In a third step, using a second swaging tool 23 having a flat striking surface 23a, the entire bottom surface of the leg part 19 pressed and spread in the second step is hammered and flatly evened out against the back side of the terminal attachment plate 13 (FIG. 5(c)).

In the terminal assembly 11 assembled by the foregoing series of steps, the flange 18 of the terminal 14 is in close contact with and engaged with the groove portion 21 of the terminal attachment plate 13 without a gap. As shown in FIG. 4(a), the terminal assembly 11 thus will not loosen even if large rotational torque N acts thereon in a rotating direction of the terminal main body 17. As shown in FIG. 4(b), the terminal assembly 11 can also bear with sufficient strength compression torque P acting on the top surface of the terminal main body 17 and shear torque E acting sideways. The terminal assembly 11 can also sufficiently bear drawing torque I orthogonal to the terminal attachment plate 13 when axially fixing the terminal 14. This can provide sufficient resistance to various types of torques from external factors. Consequently, even if the terminal assembly 11 is incorporated in a car-mounted battery and undergoes driving vibrations and/or external impact, the terminal 14 will not come off or loosen to cause a trouble in the electrical system. In particular, safety can be ensured in situations where the battery pack includes a lithium ion battery or batteries.

FIG. 6 shows a configuration of the battery pack 12 to which the terminal assemblies 11 are attached. The battery pack 12 has a pair of hole portions for electrode terminals to be inserted into in its top side. The pair of hole portions correspond to a positive electrode part and a negative electrode part. The terminal main bodies 17 of the assembled terminal assemblies 11 are inserted into the respective hole portions, and the top surfaces of the terminal attachment plates 13 are brought into close contact with and fixed to the front surface 12a of the battery pack 12. External connection terminals (not shown in the figure) are attached to the attachment holes 16 formed in the respective terminal attachment plates 13 by using bolts, nuts, etc. A plurality of battery packs 12 to which terminal assemblies 11 are thus attached are combined and external connection terminals are connected by cables or the like to constitute a storage battery serving as a power source of a hybrid vehicle or an electric vehicle. If lithium ion secondary batteries are used as the batteries, the positive electrodes are made of lithium metal oxide and the negative electrodes are made of a carbon material such as graphite. For the terminal assemblies 11 intended for the positive electrodes, the terminal attachment plates 13 are thus made of copper and the terminals 14 are made of an aluminum material.

As has been described above, according to the terminal attachment structure of the present invention, the hexagonal flange formed on the terminal is fitted into and engaged with the hexagonal groove portion formed in the terminal attachment plate. The terminal can thus be attached to the terminal attachment plate in a stable state. The leg part of the terminal protruding from the through hole formed in the center of the groove portion is then swaged and fixed to the back surface of the terminal attachment plate by flattening. This can significantly improve the resistance to rotational torque, compression torque, shear torque, and drawing torque acting on the terminal as compared to conventional terminal attachment structures.

Fitting and engaging the flange of the terminal into/with the groove portion formed in the terminal attachment plate prevents the occurrence of a gap between the joint portions of the two members, and increases the contact area. This provides the additional effect of improving electrical characteristics such as reducing the electrical resistance between the terminal attachment plate and the terminal for improved conductivity.

In the present embodiment, the terminal attachment structure according to the present invention has been described by using electrode terminals incorporated in a car-mounted battery pack as an example. The terminal attachment structure according to the present invention is also suitable for electrode terminals of batteries of non-vehicular industrial machines and small-sized household chargers which are used in a vibration- or impact-prone environment.

REFERENCE SIGNS LIST

11 Terminal assembly
12 Battery pack
12a Front surface
13 Terminal attachment plate
14 Terminal
15 Through hole
16 Attachment hole
17 Terminal main body
18 Flange
19 Leg part
20 Recess
21 Groove portion
22 First swaging tool
22a Striking surface
23 Second swaging tool
23a Striking surface

The invention claimed is:

1. A terminal attachment structure comprising:
a terminal attachment plate including a groove portion recessed in an attachment surface of the terminal attachment plate and having a polygonal inner peripheral surface and a through hole formed in a center of the groove portion, the terminal attachment plate being made of metal; and
a metallic terminal including a flange having a polygonal outer peripheral surface that has the same polygonal shape and the same size as the polygonal inner peripheral surface of the groove portion, the polygonal outer peripheral surface of the flange being fitted in the polygonal inner peripheral surface of the groove portion without a gap, a leg part that extends from a lower surface of the flange and is inserted into the through hole, the leg part having a tip which is projected from the through hole, and a terminal main body that extends from an upper surface of the flange, wherein
the leg part of the terminal is inserted in the through hole of the terminal attachment plate and the flange of the terminal is fitted into the groove portion of the terminal attachment plate, and
the tip of the leg part projected from the through hole of the terminal attachment plate is flattened, swaged on and fixed to a back surface of the terminal attachment plate in a state where the outer peripheral surface of the flange fitted in the groove portion is fitted in the inner peripheral surface of the groove portion.

2. The terminal attachment structure according to claim 1, wherein the groove portion and the flange are formed in a polygonal shape having six or fewer sides.

3. The terminal attachment structure according to claim 1, wherein the flange is formed to have a thickness generally the same as a depth of the groove portion.

4. The terminal attachment structure according to claim 1, wherein the upper surface of the flange of the terminal swaged and fixed to the terminal attachment plate is generally flush with the attachment surface of the terminal attachment plate.

5. The terminal attachment structure according to claim 1, wherein the terminal attachment plate is made of a copper material, and the terminal is made of an aluminum material.

6. The terminal attachment structure according to claim 1, wherein the leg part is greater than the terminal main body in diameter, and the leg part has a bottom surface with a recess therein.

7. The terminal attachment structure according to claim 6, wherein the recess formed in the bottom surface of the leg part has a conical shape.

8. The terminal attachment structure according to claim 2, wherein the flange is formed to have a thickness generally the same as a depth of the groove portion.

\* \* \* \* \*